United States Patent [19]

Finsterwalder et al.

[11] Patent Number: 4,908,129

[45] Date of Patent: Mar. 13, 1990

[54] IMPERVIOUS LAYER FORMATION PROCESS AND LANDFILL ADSORPTION SYSTEM

[75] Inventors: Klemens Finsterwalder, Ratingen-Hösel; Jürgen Spirres, Ratingen, both of Fed. Rep. of Germany

[73] Assignee: Dyckerhoff & Widmann Aktiengesellschaft, Munich, Fed. Rep. of Germany

[21] Appl. No.: 197,614

[22] Filed: May 23, 1988

[30] Foreign Application Priority Data

May 27, 1987 [DE] Fed. Rep. of Germany ....... 3717884
May 27, 1987 [DE] Fed. Rep. of Germany ....... 3717885

[51] Int. Cl.$^4$ .......................... B01D 23/10; C02F 7/00
[52] U.S. Cl. .................................. 210/170; 210/290; 210/747; 210/617; 210/631; 210/901; 405/129; 405/267
[58] Field of Search ............... 210/601, 615, 617, 631, 210/170, 747, 751, 901, 290; 405/128, 129, 267, 263

[56] References Cited

U.S. PATENT DOCUMENTS

| | | | |
|---|---|---|---|
| 3,310,952 | 3/1967 | Veder | 405/267 |
| 3,986,365 | 10/1976 | Hughes | 106/287.24 |
| 4,193,716 | 3/1980 | Piccagli | 405/267 |
| 4,255,067 | 3/1981 | Wright | 210/170 |
| 4,335,978 | 6/1982 | Mutch | 210/901 |
| 4,388,357 | 6/1983 | Luebke | 210/170 |
| 4,430,021 | 2/1984 | Wagner et al. | 405/129 |
| 4,430,027 | 2/1984 | Hughes et al. | 405/267 |
| 4,439,062 | 3/1984 | Kingsbury | 405/129 |
| 4,464,081 | 8/1984 | Hillier et al. | 405/128 |
| 4,473,477 | 9/1984 | Beall | 210/751 |
| 4,565,468 | 1/1986 | Crawford | 405/129 |
| 4,592,846 | 6/1986 | Metzger et al. | 210/901 |
| 4,606,675 | 8/1986 | Mitani et al. | 405/267 |
| 4,624,604 | 11/1986 | Wagner et al. | 405/128 |
| 4,678,582 | 7/1987 | Lavigne | 210/170 |
| 4,696,599 | 9/1987 | Rakoczynski et al. | 210/170 |
| 4,726,713 | 2/1988 | Tallard | 405/267 |
| 4,744,829 | 5/1988 | Eirich et al. | 210/751 |
| 4,749,479 | 6/1988 | Gray | 210/170 |
| 4,844,813 | 7/1989 | Helfgott et al. | 210/747 |

FOREIGN PATENT DOCUMENTS

1054728 5/1979 Canada ............................. 210/170

OTHER PUBLICATIONS

"No Dump Is Perfect But Here's a Good Try", *Fortune*, May 30, 1983, p. 86.

Schevon, G. R., and Damas, G., "Municipal Landfills Using Double Liners", *Waste Age*, Oct. 1985, pp. 61, 64, 69, 70.

*Primary Examiner*—Richard V. Fisher
*Assistant Examiner*—Cynthia L. Nessler
*Attorney, Agent, or Firm*—Toren, McGeady & Associates

[57] ABSTRACT

An arrangement for retaining harmful substances contained in water seeping from a waste dumping ground body includes an impervious layer of mineral sealing materials, such as clay, with an adjacent adsorption layer containing materials capable of binding harmful substances by physical and/or chemical adsorption. The materials may be in the form of admixtures. When seepage water flows very slowly through a layer of mineral sealing materials, it is possible to remove and retain the harmful substances. The permeability of the arrangement reduces with time due to the adsorption process with its sealing effect improving over geological time periods.

17 Claims, 2 Drawing Sheets

IMPERVIOUS LAYER FORMATION PROCESS AND LANDFILL ADSORPTION SYSTEM

BACKGROUND OF THE INVENTION

The present invention is directed to an arrangement for retaining harmful substances contained in water seeping from a waste dumping ground body and includes at least one impervious layer of mineral sealing materials such as clay, and a process for forming an impervious layer.

In waste dumping grounds, particularly dumping grounds for waste of an exceptional nature, it is required that the harmful substances contained in the body of the waste dumping ground not reach the biosphere. Accordingly, the waste dumping ground body is provided with a seal which is as watertight as possible, so that, if possible, harmful substances are prevented from flowing from the waste dumping ground. In the past, this problem was solved by providing impervious layers of mineral sealing materials, usually clay, which form a complete closure for the waste dumping ground body, not only to retain the seepage water contained or formed in the dumping ground, but also to prevent precipitation from penetrating into the waste dumping ground body. From a technical point of view, impervious layers of mineral sealing materials can be considered watertight for short periods of time. Since waste must be deposited in waste dumping grounds permanently, that is, perpetually, protection must be considered in terms of geological time periods, that is, very long time periods rather than short periods. In such time periods, the absolute quantity of seepage water flowing from the waste dumping ground, for example, by diffusion through the dumping ground seal, plays an essential role. The use of combination seals formed of mineral sealing materials and sealing webs of plastics material afford a high level of impermeability for the short periods of time of 30 to 50 years mentioned above, however, since the plastics material foils are formed of organic materials which loses its sealing effect due to alterations of matter after such a period of time has elapsed, a significant problem results.

SUMMARY OF THE INVENTION

Therefore, it is the primary object of the present invention to prevent water containing harmful substances from seeping out of a waste dumping ground over geological time periods.

In accordance with the present invention, at least one adsorption layer is provided with the impervious layer and contains material, at least in the form of admixtures, capable of entirely or partially binding the harmful substances in the water seeping from the waste dumping ground by means of physical and/or chemical adsorption. Such an adsorption layer can be located downstream or upstream of the impervious layer as considered in the direction of flow, and it can also be located between two impervious layers.

Like the impervious layer, the adsorption layer advisably consists at least substantially of mineral sealing material, into which the adsorbing materials are mixed The adsorption layer can be formed of two or more layers. The individual layers can contain materials of different adsorption characteristics. At least one layer can be provided with microorganisms for the adsorption of organic materials.

The individual layers of the adsorption layer can be separated from one another or from adjoining layers by intermediate layers. The intermediate layers can be formed by layers of noncohesive material such as gravel, sand or the like, layers of cohesive material such as clay or the like, or filter matting consisting of inorganic fibers such as mineral fibers or the like, and/or organic fibers such as synthetic fibers.

The inventive concept is based on the realization that mineral sealing materials consist of solid materials, that is, constituent parts of the earth's soil. Due to its arrangement, such sealing materials include pores or interstices filled in part with gas and in part with liquid. An apparent chemical stability exists between these phases under natural external conditions and is disturbed over longer periods of time through geologic transformation or weathering processes. Using mineral sealing materials for closing off a waste dumping ground body, the dumping ground seepage water penetrates very slowly into the impervious layer under the effect of dynamic pressure, that is, the head of the trapped water, and displaces the gas or water out of the pore spaces.

At the boundary between these two phases, that is, between the dumping ground seepage water and the surface of the soil particles, a transitional area is formed influenced by the electrostatic forces of the molecules of the solution and of the solid body. Based on the type and characteristics of the solid phase, there is an enrichment of the components of the liquid phase on the surface of the solid body and this is generally designated as adsorption. A distinction is made between physical and chemical adsorption according to the type of binding of dissolved particles to the molecules of the solid body. In physical adsorption, ions or molecules of the solution are bound to the solid body chiefly by van der Waals forces, it has somewhat the character of a wetting or condensation at the surface of the solid body. Conversely, in chemical adsorption, the ions disassociated in the solution are determined by the more or less polar binding with the ions of the solid body.

With the further realization that the water seeping from the waste dumping ground must not be completely retained, rather it is only the harmful substances present in the water which must be retained, the present invention uses the features of physical and chemical adsorption in the following manner:

In a slow moving flow through a layer of mineral sealing material corresponding to a seepage flow of diffusion, the harmful substances in the water are removed by adsorption on the solid body and thus retained. In theory, all types of harmful substances can be retained according to the type, thickness and composition of the addition layer.

Therefore, the substantial advantage of the present invention is that by combining an adsorption layer with an impervious layer of mineral sealing materials, particularly clay, the adsorption layer can be regarded as practically watertight relative to penetration of harmful substances. This can be achieved without the additional use of plastics material foils. Moreover, the permeability of the overall arrangement is reduced with the passage of time, because of the adsorption taking place in the adsorption layer, the sealing effect is improved and not deteriorated, as is the case in known combination seals.

The impervious layers adjoining the adsorption layer are significant for improved permeability, because of the control of the flow therethrough which is achieved with respect to the quantity as well as the flow velocity of the water loaded with the harmful substances. An impervious layer can provide this effect when it is located upstream of the adsorption layer as seen in the direction of flow, however, it can also provide the same effect when it is located downstream.

Various problems develop in the formation of such sealing layers, particularly in the installation of waste dumping grounds. In vertically extending impervious layers the problem is encountered in forming the layers with materials having a correct water content and a predetermined permeability coefficient in a homogeneous composition with compression devices under varying atmospheric conditions. Since conditions vary considerably where the work is exposed to atmospheric influences without protection, great fluctuations in quality occur.

In vertical seals, such as impervious walls, sealing materials in liquid or semiliquid form have been used for technical reasons and usually of a solids content on the order of 10 to 15%, accordingly, the overwhelming portion of these substances is water. To achieve a nominal solidity, the addition of hydraulic binders, such as cement, is required, however, such binders have the disadvantage in becoming brittle with time. Despite the addition of hydraulic binders, the durability of such impervious walls is questionable if only because of the high water content of 85 to 90%.

Therefore, in accordance with the present invention, a process or method is provided for producing an impervious layer of mineral sealing materials, that is, clay, such as bentonite, with the possible addition of mineral materials with which it is possible to install sealing substances with a high solids content in a reliable manner and without deficiencies in quality. In accordance with the present invention, the process involves the use of materials forming the impervious layer which are premixed in the dry state and are installed as a dry mixture with the moisture required for the effectiveness of the impervious layer being supplied after installation. This feature of the invention is based on the concept that the substantial problems in using mineral sealing materials depends on the moisture content of the materials, which to a very great degree determines the workability of the sealing substances in a given case. Particularly in impervious walls, the very high water content of the mixture can not be reduced for technical reasons related to the installation process.

The present invention is based on the surprising realization that it is possible to dispense entirely with the water previously considered necessary in depositing the impervious layer. It has been found to be possible to install the required mixture in a dry state and to supply the needed water subsequently and to distribute it in the layer by diffusion. The required water can be provided from the natural moisture in the soil, that is, by means of ground water, or through other measures, such as by pipeline for supplying surface water, which pipelines are incorporated into the impervious layer. The construction and composition of the sealing substances can be adapted very easily to the respective limiting conditions.

The advantage of installing the mixture in the dry state involves first, a noticeable improved durability is achieved with easy workability of the dry mixture, and the improved durability results in great impermeability due to the increased proportion of solids in the mixture. The dry mixture does not impair its installation ability, it is always dry.

The inclusion of hydraulic binders, such as cement, is unnecessary because of the great impermeability which can be achieved whereby, if desired, a certain flexibility of the impervious layer can be predetermined, as is often required in mining subsidence regions. Hydraulic binders can be mixed in individual cases. Since the basic sealing materials are premixed in the dry state the composition can be determined in a very deliberate way, for example, with the same standard of quality as in mixing concrete.

The sealing materials are selected for stability with respect to filters. Possible unintentional loose zones restore themselves by means of swelling pressure occurring during the absorption of water. Such pressures can reach the magnitude of 20 to 30 $kN/m^2$.

In accordance with the present invention, horizontally, diagonally or vertically extending impervious layers can be constructed. As an example, horizontal surface seals can be formed with finishers, as used in roadway construction. In such a procedure, the surfaces being formed must be protected from precipitation. The areas of contact with the natural subsoil or with some type of waste dumping ground body can be covered with filter layers, such as woven filter matting.

In the formation of vertical impervious walls, the sealing material, free of water, must be introduced into a supporting fluid. This operation can be carried out in a way similar to depositing concrete under water, however, with the difference that the deposited sealing material acts like a solid body with limited strength as a result of its internal friction and the filter cakes which form because of contact with the supporting fluid. If the sealing substance is introduced in stages as individual sections, the sections remain stable as long as the wall pressure in the section is less that the hydrostatic pressure of the supporting fluid. This condition is generally satisfied when the angle of the internal friction of the dry sealing material is greater than 15°. If the angle falls below 15° because of the high clay content, then the section can be formed inclined at a predetermined angle with respect to the vertical.

It is also possible to carry out the installation in the classic manner of subterranean work, where the individual sections are separated by formwork members, such as pipes. In such a situation, the introduction of the material in the dry state has the advantage over underwater concrete that the formwork pipe can be removed immediately after the material is introduced, there is no need to wait for the material to set.

The various features of novelty with characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
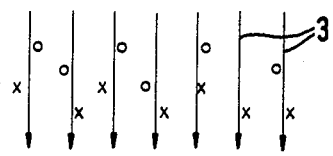
FIG. 1 is an elevational sectional view through the base region of a waste dumping ground formed in accordance with the present invention.
Figure 1:
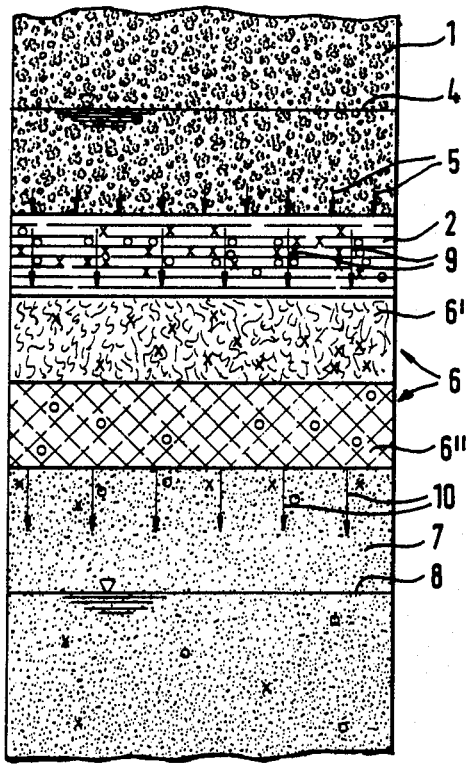

As shown schematically in FIG. 1, the lower region of a waste dumping ground body 1 is located over an impervious layer 2 of a mineral sealing material, such as clay. A water level 4 of trapped water is located in the body 1 spaced upwardly from the impervious layer 2. The water level 4 acts with a certain dynamic pressure or head, note arrow 5, on the surface of the impervious layer 2. The water level 4 is present due to water formed in the body of the waste dumping ground or due to precipitation as indicated by the arrows 3. Precipitation 3 can be loaded by harmful substances indicated by the symbols "x" and "o", causing additional harmful substances to be released from the waste dumping ground body 1.

Below the impervious layer 2 is an adsorption layer 6. Adsorption layer 6 is made up of two layers, that is, an upper layer 6' and a lower layer 6''. Below the adsorption layer 6 is the natural soil formation 7 containing a ground water table 8, spaced below the adsorption layer.

In FIG. 1, seepage water indicated by the arrows 9 loaded with harmful substances, initially slowly penetrates into the impervious layer 2 and seeps through the layer as a result of the head indicated by arrow 5 acting on the impervious layer. The quantity and speed of penetration can be regulated by the controlled permeability of the impervious layer 2. The seepage water then penetrates into the upper layer 6' of the adsorption layer 6 where a portion "x" of the harmful substances is retained, and then flows downwardly into the lower layer 6'' of the adsorption layer 6 where additional and possibly different harmful substances "o" are retained. The seepage water indicated by the arrows 10 now contains only small harmless concentrations of the harmful substances and flows into the soil 7 below the adsorption layer 6 and adds to the ground water indicated by the water table 8.

The type, thickness and arrangement of the impervious layer 2 and the adsorption layer 6, which may consist of multiple layers, are dependent on the types and quantity of the expected harmful substances. The number of layers of absorption layer 6 depends on the types of expected harmful substances if various absorption materials are used in the individual layers. The thickness of the layers is based on an estimation of the amount of harmful substances occurring for a given time. Moreover, it must be taken into consideration that the absolute impermeability of the layers is considerably increased due to additions and inclusions occurring in the absorption processes. Accordingly, the known undesirable increase in permeability due to internal erosion or chemical aging such as in foil material, can not take place in the present invention, on the contrary, an impervious layer formed according to the present invention will become increasingly watertight in the course of time.

The composition of the adsorption layer 6 and the individual layers 6' and 6'' forming the adsorption layer is determined based on the type of harmful substances developed. Mineral sealing materials in particular clay, to which adsorbing materials are mixed, are used as the basic material. Accordingly, the layer containing a mixture of clay, for instance bentonite and calcium hydroxide, can be used for adsorbing heavy metals. For adsorbing organic substances, a mixture of mineral material can be used in which determined microorganisms can be added by mixing for enabling the adsorption of organic material such as oils, PCB (polychlorinated biphenyls) and other materials.

Figure 2:
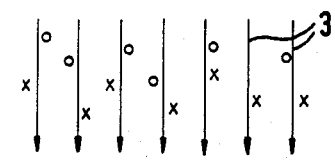
FIG. 2 is a cross-sectional view similar to FIG. 1 with a different layer arrangement embodying the present invention.
Figure 2:
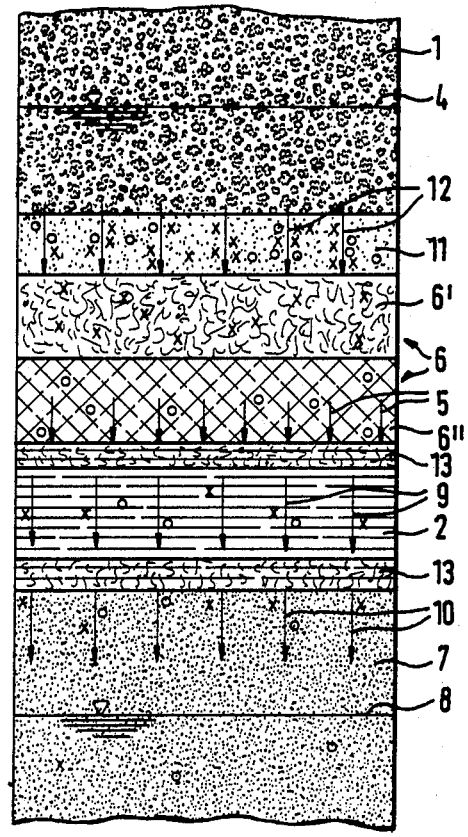

In FIG. 2 another arrangement of layers embodying the present invention is shown in cross-section similar to that in FIG. 1. In this arrangement, the impervious layer 2 made up of mineral sealing material, such as clay, is positioned between two filter layers 13 constructed of filter matting and located beneath the adsorption layer 6 separated from the waste dumping ground body 1 by an intermediate layer 11 of noncohesive material, such as sand. In a manner similar to that described with regard to FIG. 1, arrows 12 indicate the seepage water passing out of the waste dumping ground body 1 and containing high amounts of harmful substances which flows downwardly through the sand layer 11 directly into the adsorption layer 6 made up of the two layers 6' and 6'' for retaining the harmful substances by adsorption. Since, in this arrangement the actual impervious layer 2 has a permeability less than that of the adsorption layer 6, a head of water indicated by the arrow 5 is located in the adsorption layer acting on the upper filter layer 13. It is possible that the head 5 of water may extend above the adsorption layers 6.

As shown by the arrow 9, seepage water within the impervious layer 2, having passed through the adsorption layers 6, is only slightly loaded with harmless concentrations which flow through the impervious layer 2 and, as indicated by the arrows 10, passes through the lower filter layer 13 and enters into the ground water having a water table level 8 shown spaced downwardly from the impervious layer 2.

Figure 3:
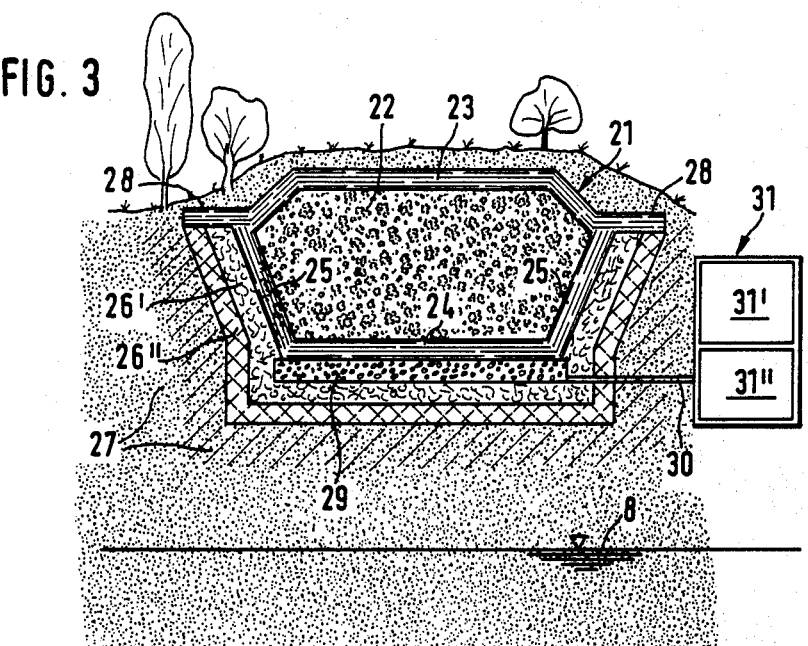
FIG. 3 is a vertical cross-sectional view through a waste dumping ground embodying the present invention.

FIG. 3 displays a section through a waste dumping ground with a covering formed of a succession of layers, in accordance with the present invention, enclosing the dumping ground.

In the waste dumping ground in FIG. 3, covering 21 consists first of an impervious layer 23 formed of a mineral sealing material such as clay, which completely encloses the body 22 of the waste dumping ground. In the region of the bottom 24 and the upwardly extending sloping sides 25, a first adsorption layer 26' and a second adsorption layer 26'' are located contiguously and along the outer surface of the impervious layer 23. The adsorption layers 26', 26'' are deposited on the available prepared earth 27 in which the waste dumping ground body is located. Absorption layers 26', 26'' are made and constructed in the manner described above with regard to FIG. 1. Impervious layer 23 has parts 28 extending laterally outwardly over the upper end of the upwardly inclined adsorption layers 26', 26'' to provide a cover for them.

Another feature of the present invention is displayed in FIG. 3 where a drainage layer 29 is located below the base portion 24 of the impervious layer 23 and is connected with a special adsorption unit 31 by a line 30. Adsorption unit 31 is shown only schematically, it is formed of impervious layers and adsorption layers in the same manner as described with regard to FIGS. 1 and 2. Adsorption unit 31 is located alongside and/or slightly below the waste dumping ground and may include a number of chambers, such as a chamber 31' containing adsorbers for specific harmful substances, such as heavy metals, and another chamber 31", for providing a biological purification of the seepage water.

External adsorption unit 31 can be active in the initial state if a greater amount of liquid containing harmful substances is expected from the waste dumping ground body 22. Further it can be active in case of a disturbance if, at a later point in time, precipitation is retained by the covering impervious layer 23 which is greater than possible runoff, or in the upwardly extending adsorption layers 26', 26" located adjacent the covering 21, added by means of adsorption. In a waste dumping ground formed in this manner, a plurality of adsorber units can-be provided and additional units can be added later.

Figure 4:
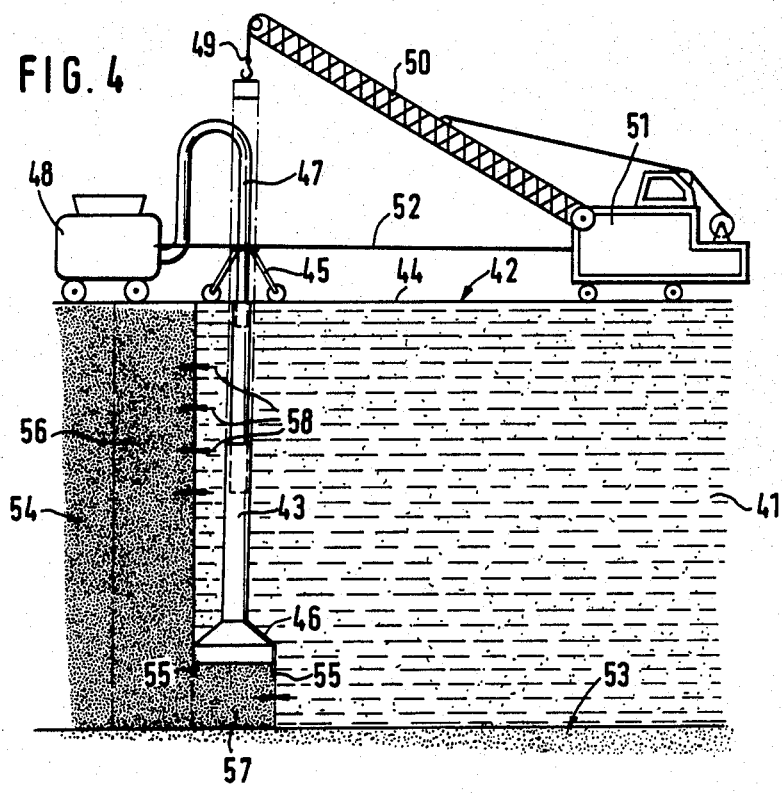
FIG. 4 is a schematic illustration of the method of forming an impervious vertical wall.

With the aid of FIG. 4, the manner of constructing a section 56 of a vertical impervious wall within a channel 42 filled with a thixotropic supporting liquid, such as a bentonite suspension, can be explained. A device including a telescoping pipe 43 is supported on a guide car 45 located at the ground surface 44. A funnel-shaped housing 46 is located at the lower end of the pipe 43. A filling hose 47 is connected to and extends upwardly from the telescoping pipe 43 and receives a dry sealing material from a portable pump 48. Telescoping pipe 43 with the housing 46, which forms a laterally closed passageway can be raised and lowered by a hoisting cable 49 connected to a boom 50 of a crane 51. Crane 51 is also connected to the guide car 45 and the pump 48 via a pull rope 52, whereby the telescoping pipe 43 with the housing can be moved not only in the vertical direction but can be moved in the horizontal direction by the crane 51.

After the telescoping pipe 43 with the housing 46 at its lower end is lowered into the base 53 of the channel 42, the dry sealing material is introduced into the channel 42 through the filling hose 47 by means of the pump 48. To assure that the inner surface of the telescoping pipe 43 and the housing 46 remain dry when lowered into the thixotropic fluid, the lower opening in the housing 46 can be closed, by means of a flap, a slide or the like, not shown. After opening the closure, the sealing material can flow out. As the sealing material is introduced, the housing 46 is raised and the telescoping pipe 43 is correspondingly shortened, while at the same time the portion of the supporting fluid corresponding to the volume of the inserted sealing material is displaced. Compression of the dry sealing material does not seem to be necessary. At 1.8 to 2.0, its density is significantly greater than that of the supporting fluid which is approximately 1.08, whereby the dry powder is deposited in a compact manner. Build-up of the mixture can be counteracted by installing a worm conveyor or the like.

Housing 46 has impervious blankets 55 on two opposite sides for guiding the previously constructed section 56 and to separate cleanly the upper region of the formed section 57 against the supporting fluid 41.

As long as the wall pressure in the last section produced is smaller than the hydrostatic pressure of the supporting fluid, the section remains stable as indicated by the pairs of arrows 58 in FIG. 4. These conditions are generally met if the angle of the internal friction of the dry mixture is greater than 15°. If the angle of internal friction drops below 15°, such as in the instance of a very high bentonite content, vertically extending sections are not stable and they must be produced with a certain inclination or slope to guarantee stability. In such an instance, the telescoping pipe 43 with its housing 46 is guided in an upwardly sloping manner.

While specific embodiments of the invention have been shown and described in detail to illustrate the application of the inventive principles, it will be understood that the invention may be embodied otherwise without departing from such principles.

We claim:

1. Arrangement for removing harmful substances from water seeping from a waste dumping ground body into a natural soil formation, comprising at least one impervious layer containing mineral sealing materials, wherein the improvement comprises an adsorption layer located adjacent to the impervious layer, said adsorption layer includes materials capable of binding the harmful substances in the water seeping from the waste dumping ground body by at least one of physical or chemical adsorption, the adsorption layer is located downstream of the impervious layer relative to the direction of flow of water through the impervious layer and between the natural soil foundation and the impervious layer so that water exiting from the adsorption layer flows into the natural soil formation free of any flow blockage, the adsorption layer includes mineral sealing materials mixed with adsorbing materials, said mineral sealing material comprises clay, and the adsorption layer is formed of at least two different adsorption layers, each of the different adsorption layers contains material with different adsorption characteristics.

2. Arrangement, as set forth in claim 1, wherein at least one different adsorption layer includes microorganisms for the adsorption of organic materials.

3. Arrangement, as set forth in claim 1, wherein said impervious layer and said adsorption layer are separated from one another by an intermediate layer.

4. Arrangement, as set forth in claim 3, wherein said intermediate layer is formed of a layer of noncohesive material made up of at least one of sand or gravel.

5. Arrangement, as set forth in claim 3, wherein said intermediate layer is formed of a cohesive clay material 6. Arrangement, as set forth in claim 3, wherein said intermediate layer is formed of a filter matting.

7. Arrangement, as set forth in claim 6, wherein said filter matting is formed of inorganic mineral fibers.

8. Arrangement, as set forth in claim 6, wherein said filter matting is formed of synthetic organic fibers.

9. Arrangement, as set forth in claim 6, said intermediate layer is formed of inorganic mineral fibers and synthetic organic fibers.

10. Process of forming an impervious layer of mineral clay sealing materials for a waste dumping ground body, comprising forming a prepared earth base in earth in which the waste dumping ground body is to be formed, forming a premixed dry mixture consisting of mineral clay sealing materials free of water, and installing the mixture in a dry state separate from the earth forming the earth base as a lining layer for the waste dumping ground body, and supplying moisture required for the effectiveness of the lining layer after installing the layer.

11. Process, as set forth in claim 10, wherein said moisture is supplied in the form of naturally occurring soil moisture.

12. Process, as set forth in claim 10, wherein said moisture is supplied in the form of surface water.

13. Process, as set forth in claim 10, including the step of adding a hydraulic binder to the dry mixture.

14. Process, as set forth in claim 10, including the steps of forming a channel for the waste dumping ground body with upwardly extending channel side walls, filling the channel with a thixotropic supporting fluid, constructing waste dumping ground body side walls in the channel in upwardly extending adjacent individual sections using the dry mixture by directing the dry mixture through a laterally closed passageway along the channel side wall in individual sections extending from the lower end to the upper end of the channel side wall with each section having a shaped cross-section so that each section extends approximately to the height of the channel side wall.

15. Process, as set forth in claim 14, including stabilizing the surfaces of the sections of the waste dumping ground body side wall sections in contact with the supporting fluid by means of the supporting fluid.

16. Process, as set forth in claim 14, including inclining a surface of the section contacting the supporting fluid outwardly in the upward direction toward an adjacent channel side wall as a function of the angle of the internal friction of the dry mixture.

17. Process of forming an impervious layer of mineral clay sealing materials for a waste dumping ground body, comprising forming a prepared earth base in earth in which the waste dumping ground body is to be formed, forming a premixed dry mixture consisting of mineral clay sealing materials free of water, installing the mixture in a dry state separate from the earth forming the earth base as a lining layer for the waste dumping ground body, forming the lining layer with a first surface facing the earth base and an oppositely directed second surface, depositing at least one adsorption layer adjacent one of the first and second surfaces of the lining layer, and utilizing as the adsorption layer materials capable of binding harmful substances in water seeping from the waste dumping ground by at least one of physical or chemical adsorption.

* * * * *